United States Patent [19]

Cullen

[11] Patent Number: 5,600,947

[45] Date of Patent: Feb. 11, 1997

[54] METHOD AND SYSTEM FOR ESTIMATING AND CONTROLLING ELECTRICALLY HEATED CATALYST TEMPERATURE

[75] Inventor: Michael J. Cullen, Northville, Mich.

[73] Assignee: Ford Motor Company, Dearborn, Mich.

[21] Appl. No.: 498,211

[22] Filed: Jul. 5, 1995

[51] Int. Cl.$^6$ ............................................. F01N 3/20
[52] U.S. Cl. ........................... 60/274; 60/300; 60/284
[58] Field of Search ......................... 60/274, 286, 300, 60/284

[56] References Cited

U.S. PATENT DOCUMENTS

| | | | |
|---|---|---|---|
| 4,656,829 | 4/1987 | Creps et al. | 60/277 |
| 5,184,463 | 2/1993 | Becker et al. | 60/284 |
| 5,224,335 | 7/1993 | Yoshizaki | 60/300 |
| 5,257,501 | 11/1993 | Wataya | 60/284 |
| 5,261,230 | 11/1993 | Yuuki et al. | 60/276 |
| 5,303,168 | 4/1994 | Cullen et al. | 364/557 |
| 5,323,607 | 6/1994 | Tanaka et al. | 60/274 |
| 5,385,017 | 1/1995 | Harada | 60/286 |
| 5,414,994 | 5/1995 | Cullen et al. | 60/274 |
| 5,444,976 | 8/1995 | Gonze | 60/286 |

*Primary Examiner*—Douglas Hart
*Attorney, Agent, or Firm*—Joseph W. Malleck; Roger L. May

[57] ABSTRACT

A method and system for estimating and controlling the temperature of an electrically heated catalyst having a heating element disposed in an exhaust passage of an internal combustion engine. Mass air flow into the engine is sensed. A temperature at an inlet of the catalyst is first determined. Next, a steady-state temperature rise of the heating element is determined based on the catalyst inlet temperature. The steady-state temperature rise is converted into an instantaneous temperature rise having a time constant based on the sensed mass air flow. A total catalyst temperature of the catalyst is then determined based on the catalyst inlet temperature and the instantaneous temperature rise. Finally, the heating element of the electrically heated catalyst is controlled based on the total catalyst temperature.

20 Claims, 4 Drawing Sheets

5,600,947

METHOD AND SYSTEM FOR ESTIMATING AND CONTROLLING ELECTRICALLY HEATED CATALYST TEMPERATURE

TECHNICAL FIELD

This invention relates to methods and systems for estimating and controlling exhaust gas temperatures of an internal combustion engine.

BACKGROUND ART

An exhaust emission control apparatus includes a catalytic converter provided in an exhaust passage of an internal combustion engine to perform catalytic conversion of exhaust gases from the engine. The catalytic converter typically includes a catalyst and a heater for heating the catalyst to accelerate the rate of the catalytic conversion of exhaust gases when the engine undergoes a cold start. Electric power is applied to the heater of the converter for heating the catalyst in the catalytic converter.

It is necessary to operate the catalytic converter at high temperatures after a cold engine start in order to reduce the time for the catalyst to be activated. However, it is undesirable to operate at excessive temperatures for a long period of time since thermal deterioration is a significant contributor to a loss of monolithic three-way catalyst activity. This deterioration results in a decline in the conversion efficiency of the converter thereby reducing its effectiveness thereafter to achieve the desired performance. In order to prevent this deterioration in the catalytic converter, it is necessary to take corrective action when the temperature of the catalytic converter approaches an undesirable level that may result in its deterioration and therefore its performance.

The known prior art provides for sensing the temperature of the catalytic converter utilizing a sensor as well as estimating the temperature of the catalytic converter. One known prior art method of estimating the temperature of the catalytic converter is disclosed in U.S. Pat. No. 4,656,829, issued to Creps et al. The catalytic converter temperature is estimated based on engine operating parameters utilizing empirically determined steady state temperature contributions to the catalytic converter from the mass air flow through the engine and the air/fuel ratio of the mixture supplied to the engine. There is no specific compensation for the heat generated by the heater of the catalytic converter.

DISCLOSURE OF THE INVENTION

It is thus a general object of the present invention to provide a simple, inexpensive method and system for accurately determining and controlling the temperature of a catalytic converter.

In carrying out the above objects and other objects, features and advantages, of the present invention, a method is provided for determining the temperature of the catalyst due to the heater. The method includes the step of sensing a mass of air flow into the engine and generating a corresponding mass air flow signal. The method also includes the step of determining a catalyst inlet temperature at the inlet of the catalyst. The method further includes the step of determining a heater steady-state temperature rise of the heating element based on the catalyst inlet temperature. Still further, the method includes the step of determining a heater instantaneous temperature rise of the heating element based on the heater steady-state temperature rise and a time constant derived from the mass air flow signal. Furthermore, the method includes the step of determining a total catalyst temperature of the catalyst based on the catalyst inlet temperature and the heater instantaneous temperature rise. Finally, the method includes the step of controlling the heating element of the electrically heated catalyst based on the total catalyst temperature.

In further carrying out the above objects and other objects, features and advantages, of the present invention, a system is also provided for carrying out the steps of the above described method. The system includes a sensor for sensing a mass of air flow into the engine and generating a corresponding mass air flow signal. The system also includes means for determining a catalyst inlet temperature at the inlet of the catalyst. The system further includes means for determining a heater steady-state temperature rise of the heating element based on the catalyst inlet temperature. Still further, the system includes means for determining a heater instantaneous temperature rise of the heating element having a time constant based on the heater steady-state temperature rise and the mass air flow signal. Furthermore, the system includes means for determining a total catalyst temperature of the catalyst based on the catalyst inlet temperature and the heater instantaneous temperature rise. The system also includes a control unit for controlling the heating element of the electrically heated catalyst based on the total catalyst temperature.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
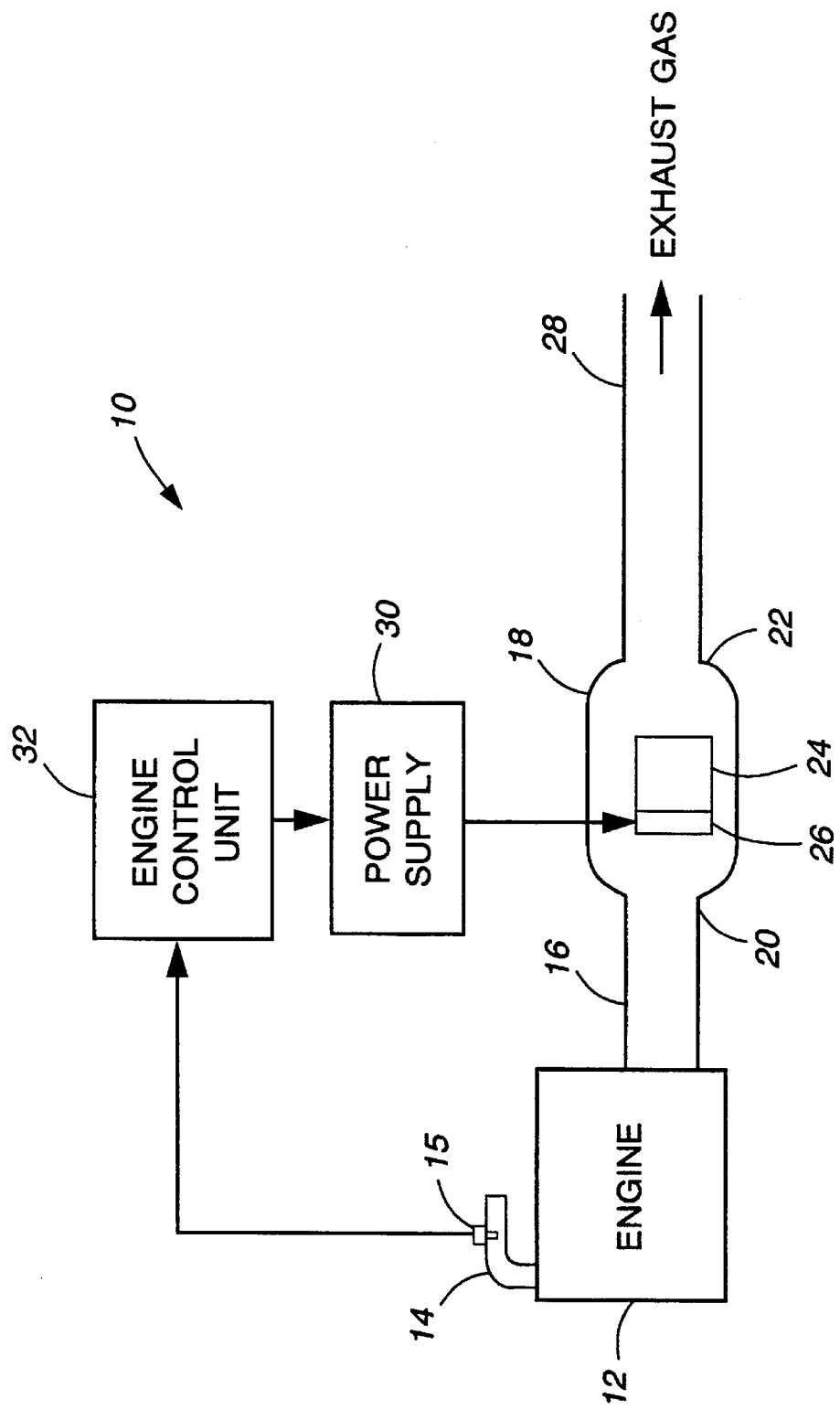
FIG. 1 is a block diagram of the preferred embodiment of the present invention.

Turning now to FIG. 1, there is shown a block diagram of the system of the present invention, denoted generally by reference numeral 10. The system 10 includes an internal combustion engine 12 having an intake manifold 14 and an exhaust manifold 16. Positioned in the intake manifold 14 is a conventional mass air flow sensor 15 for providing a signal representing the mass air flow into the engine 12.

Coupled to the exhaust manifold 16 is a catalytic converter 18 having an inlet 20 and an outlet 22. As the engine 12 burns a fuel mixture, exhaust is drawn from the engine 12 into the exhaust manifold 16. From the exhaust manifold 14, the exhaust flows into the catalytic converter 18 via the inlet 20. The catalytic converter 18 includes a catalyst 24 for performing catalysis to purify the exhaust and a heater 26 for heating the catalyst 24. The catalyst 24, usually a combination of platinum and palladium, convert hydrocarbon (HC), carbon monoxide (CO) and nitrogen oxides ($NO_x$) into inert emissions. Coupled to the outlet 22 of the catalytic converter 18 is a tail pipe 28 for discharging the converted exhaust gases into the atmosphere.

The system 10 further includes a power supply 30 for providing power to the heater 26. Electrical current from the power supply 30 flows through the heater 26 which then heats the catalyst 24. The system 10 also includes an engine control unit 32 coupled to the power supply 30 for controlling the heater 26. the engine control unit 32 also receives the mass air flow signal from the mass air flow sensor 15.

Figure 2A:
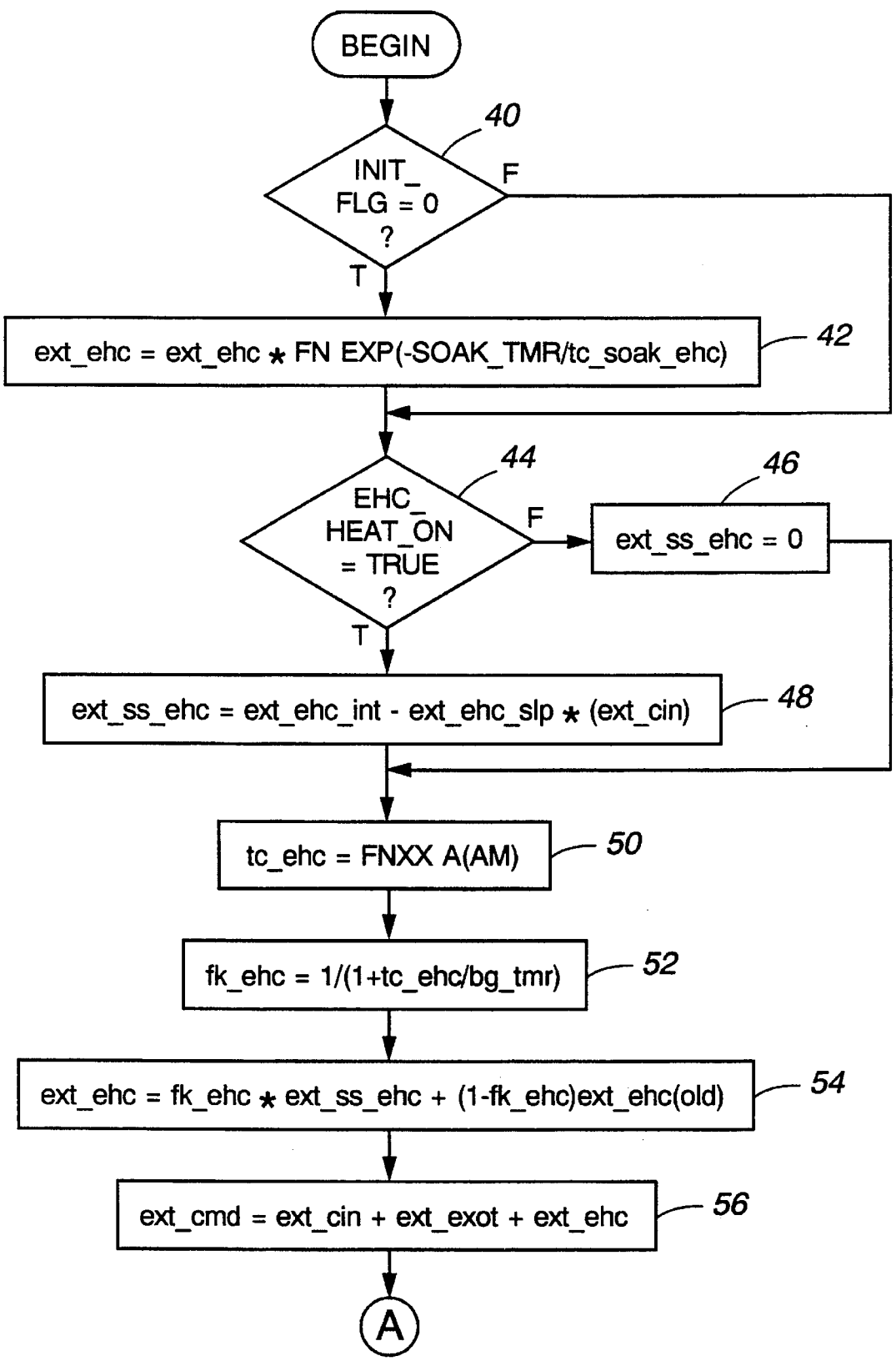
FIG. 2 is a flow chart illustrating the general sequence of steps associated with the method of the present invention.
Figure 2B:
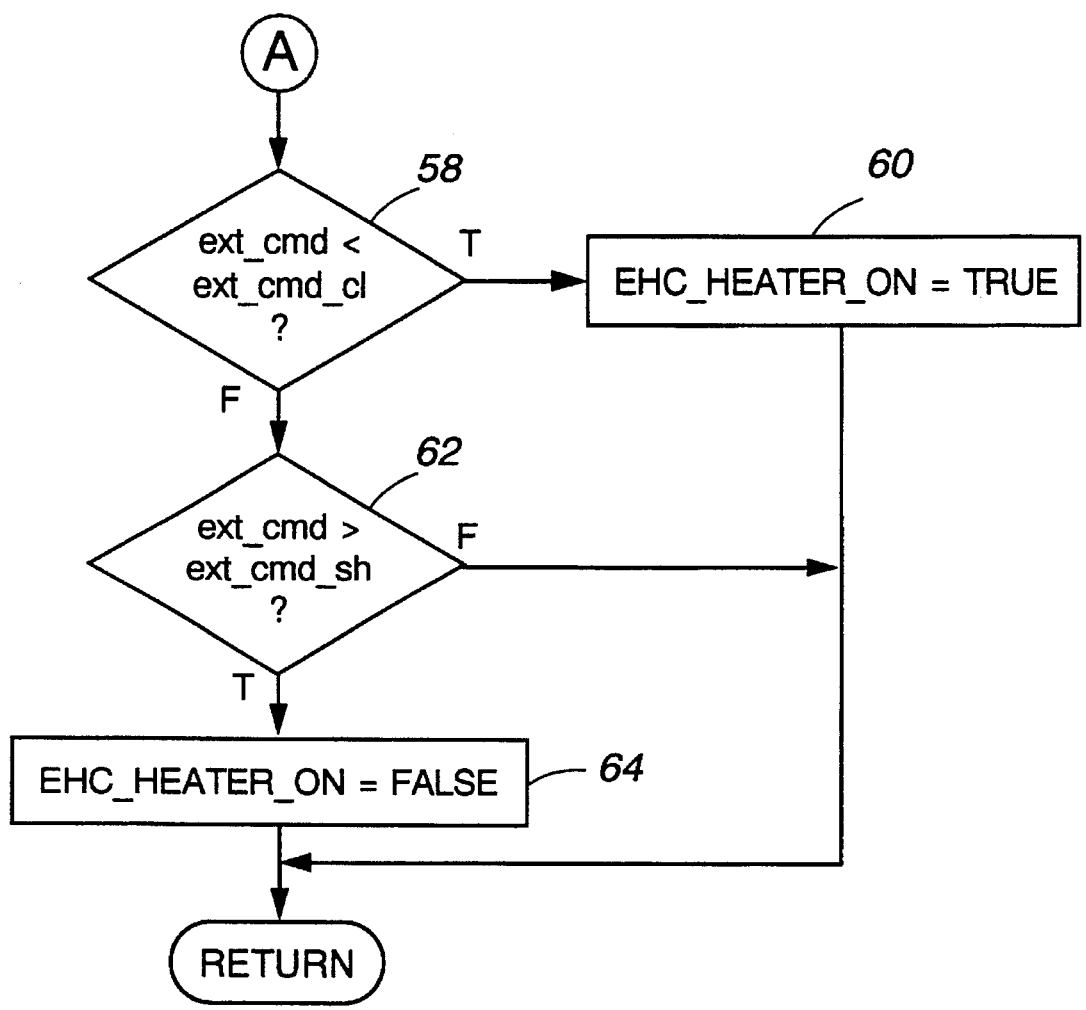

In predicting engine gas temperature during engine operation, it is necessary to model the effect of the electrically heated catalyst 24 in order obtain a more accurate prediction. Turning now to FIG. 2, the method of the present invention will now be described. The method includes the step of determining whether initialization should take place, as shown at block 40. Initialization takes place only after the engine 12 is first started. When the vehicle is shut off, the last estimated temperature of the heater 26 is stored in a keep alive memory (KAM) (not shown) of the engine control unit 32 for use in determining a new temperature of the heater 26 when the vehicle is turned back on.

An initialization flag, INIT_FLG, is checked at block 40. If the INIT_FLG is zero initialization occurs, as shown at block 42. The initialization takes into consideration the rate at which heat due to the heater 26 dissipates when the engine 12 is turned off. The estimated temperature of the heater 26 is determined in accordance with the following:

$$ext\_ehc=ext\_ehc(old)*FNEXP(-SOAK\_TMR/tc\_soak\_ehc),$$

wherein:

ext_ehc represents an updated estimate of the temperature of the heater 26, ext_ehc(old) represents the previous estimate of the temperature of the heater 26 that was stored in KAM when the engine 12 was turned off, as will be described in greater detail below, FNEXP is an engine control unit 32 function which performs the exponential function on the argument in the parenthesis, SOAK_TMR represents the period of time the engine 12 has been turned off, and tc_soak_ehc represents a calibratable time constant that describes the rate at which the heat due to the heater 26 dissipates when the engine 12 is off.

Figure 3:
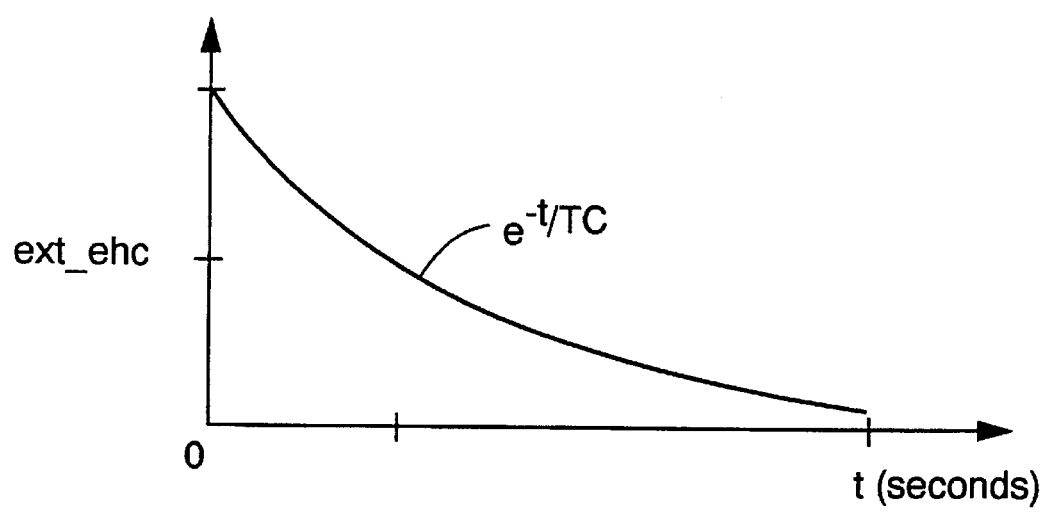
FIG. 3 is a graphical representation of the rate of heat dissipation of the heater over time.

The value SOAK_TMR can be determined using a conventional counter or a capacitor in which the charge is monitored. The value tc_soak_ehc represents the theoretical behavior of a heated element as it cools off and is determined empirically. A graph illustrating how the temperature of the heater 26 decreases as time passes is shown in FIG. 3. The heat due to the heater 26 dissipates exponentially, $e^{-t/TC}$, with time.

Figure 4:
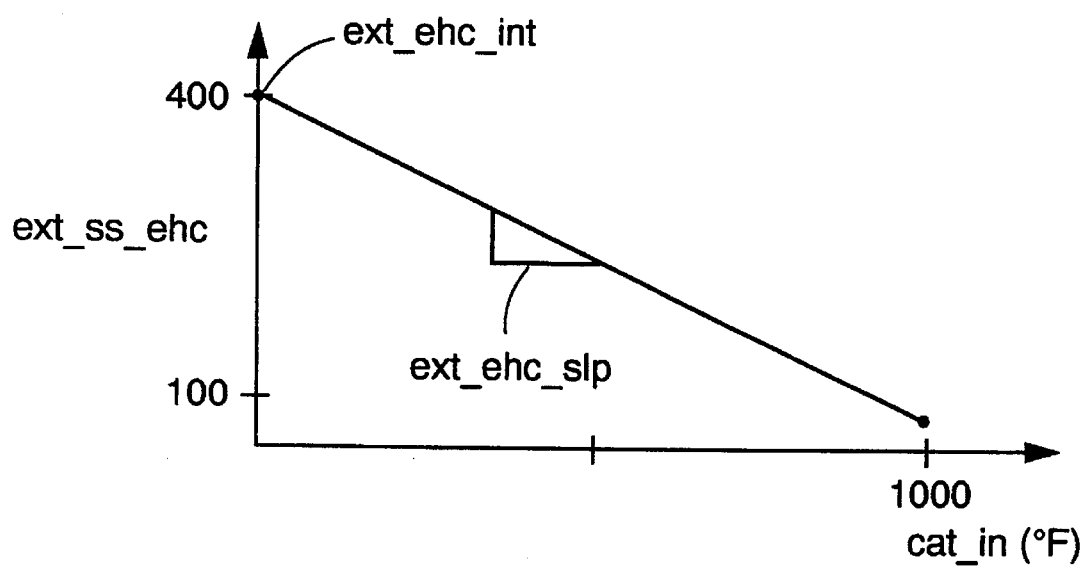
FIG. 4 is a graphical representation of the relationship between the catalyst inlet temperature and the steady-state temperature rise of the heater.

After the initialization step, the method proceeds to determine whether the heater 26 is on, as shown at block 44. If the heater 26 is off, the steady-state temperature rise (ext_ss_ehc) of the heater 26 is zero, as shown at block 46. However, if the heater 26 is on, the steady-state temperature rise of the heater 26 is estimated, as shown at block 48. The steady-state temperature rise of the heater 26 is empirically determined to be linearly related to the temperature of the inlet 20 of the catalyst 18. A graph illustrating the relationship between the catalyst inlet temperature and the steady-state temperature rise of the heater 26 is shown in FIG. 4. Alternatively, the steady-state temperature rise may be represented as a function of the catalyst inlet temperature and stored in a look-up table as FNX(ext_cin).

The steady-state temperature rise of the heater 26 is estimated in accordance with the following:

$$ext\_ss\_ehc=ext\_ehc\_int-ext\_ehc\_slp*(ext\_cin),$$

wherein:

ext_ehc_int represents the intercept of the equation relating the heat of the heater 26 to the catalyst inlet temperature, i.e., approximately 400° F., ext_ehc_slp is the slope of the equation relating the heat of the heater 26 to the catalyst inlet temperature, i.e., approximately 0.3, and ext_cin is the temperature at the catalyst inlet 20.

The catalyst inlet temperature may be determined using a sensor. However, in keeping with the invention, the catalyst inlet temperature may be estimated according to the method disclosed in U.S. Pat. No. 5,303,168, issued to Cullen et al., and further in U.S. Pat. No. 5,414,994, issued to Cullen et al., which are hereby incorporated by reference.

The method proceeds to convert the steady-state temperature rise of the heater 26 into an instantaneous temperature rise. First, a time constant, tc_ehc, is determined which describes the rate at which the temperature of the catalyst 24 rises in seconds, as shown at block 50. The time constant is empirically determined based on the mass air flow signal generated by the mass air flow sensor 15. The higher the mass air flow signal, the longer it takes the temperature of the catalyst 24 to rise. The time constant is determined as follows:

$$tc\_ehc=FNXXA(AM),$$

wherein:

FNXXA is a calibratable function describing the time constant versus air mass, and AM is the sensed mass air flow in lbs/minute.

As shown at block 52, a filter constant, fk_ehc, approximating the exponential behavior of the time constant is determined in order to implement the time constant in a digital system. The filter constant is determined in accordance with the following:

$$fk\_ehc=1/(1+tc\_ehc/bg\_tmr),$$

wherein bg_tmr represents the time since the last background loop has been run.

Next, the method continues to determine the instantaneous temperature rise, ext_ehc, of the heater 26, as shown at block 54. The instantaneous temperature rise of the heater is determined in accordance with the following:

$$ext\_ehc=fk\_ehc*ext\_ss\_ehc+(1-fk\_ehc)*ext\_ehc(old).$$

Now that the instantaneous temperature rise due to the heater 26 is known, a more accurate total temperature of the catalyst 24, ext_cmd, is determined, as shown at block 56. The total catalyst temperature is determined in accordance with the following:

$$ext\_cmd=ext\_cin+ext\_exot+ext\_ehc,$$

wherein ext_exot represents the estimated contribution to the temperature of the catalyst 24 due to exothermic reactions at the inlet 20 of the catalyst 24. The values of ext_exot are a function of the engine air flow and are determined experimentally. The exothermic reaction contribution may be determined according to the method disclosed in U.S. Pat. Nos. 5,303,168 and 5,414,994.

Knowing the total catalyst temperature, the heater 26 of the catalyst 24 is controlled accordingly. The method continues to compare the total catalyst temperature with a first temperature threshold, ext_cmd_cl, as shown at block 58. The first temperature threshold is a calibratable temperature of the catalyst 24, e.g., approximately 1600° F., indicating the catalyst 24 is damaged. If the total catalyst temperature is below the first temperature threshold, the heater 26 is turned on, as shown at block 60.

If the total catalyst temperature exceeds the first temperature threshold, the total catalyst temperature is compared to a second temperature threshold, ext_cmd_sh, as shown at block 62. If the total catalyst temperature exceeds the second temperature threshold, the heater 26 is turned off, as shown at block 64. The second temperature threshold is also calibratable and is set at about 100° F. higher than the first temperature threshold to provide a hysteresis effect to prevent the resistance heat from repeatedly turning on and off.

Alternatively, the ext_cmd_cl may be set at approximately 800° F. and the ext_cmd_sh at approximately 900° F. to improve fuel economy. At temperatures above approximately 800° F., the catalyst 24 achieves peak emission conversion efficiency without the aid of the heater 26.

The present invention allows for an accurate estimate of the catalyst temperature without a sensor adding to the cost and reliability of the system. Furthermore, the present invention enables the optimum combination of low emissions and potential fuel economy savings as well as the elimination of catalyst over-temperature.

While the best mode for carrying out the invention have been described in detail, those familiar with the art to which this invention relates will recognize various alternative designs and embodiments for practicing the invention as defined by the following claims.

What is claimed is:

1. For use in reducing exhaust gas emissions of an internal combustion engine including an exhaust passage, an electrically heated catalyst disposed in the exhaust passage and having an inlet, an outlet and a heating element, and a power supply for providing power to the heating element, a method for estimating and controlling a temperature of the electrically heated catalyst, the method comprising:

sensing a mass of air flow into the engine and generating a corresponding mass air flow signal;

determining a catalyst inlet temperature at the inlet of the catalyst;

determining a heater steady-state temperature rise of the heating element based on the catalyst inlet temperature;

determining a heater instantaneous temperature rise of the heating element having a time constant based on the heater steady-state temperature rise and the mass air flow signal;

determining a total catalyst temperature of the catalyst based on the catalyst inlet temperature and the heater instantaneous temperature rise; and controlling the heating element of the electrically heated catalyst based on the total catalyst temperature.

2. The method as recited in claim 1 wherein the heater steady-state temperature rise (ext_ss_ehc) is linearly related to the catalyst inlet temperature (ext_cin) having an intercept (ext_ehc_int) and a slope (ext_ehc_slp) and wherein the step of determining the heater steady-state temperature rise is determined in accordance with the expression:

ext_ss_ehc=ext_ehc_int−(ext_ehc_slp*ext_cin).

3. The method as recited in claim 1 wherein the heater steady-state temperature rise (ext_ss_ehc) is empirically determined based on the catalyst inlet temperature (ext_cin) and wherein the step of determining the heater steady-state temperature rise is determined utilizing a look-up table stored in a memory.

4. The method as recited in claim 1 wherein the step of determining the heater instantaneous temperature rise includes the step of determining a filter constant representing a digital implementation of the time constant and wherein the heater instantaneous temperature rise (ext_ehc) is determined in accordance with the expression:

ext_ehc=fk_ehc*ext_ss_ehc+(1−fk_ehc)*ext_ehc(old), where fk_ehc is the filter constant, ext_ss_ehc is the heater steady-state temperature rise and ext_ehc(old) is the previously determined heater instantaneous temperature rise.

5. The method as recited in claim 1 wherein the step of determining the total catalyst temperature further comprises the step of determining a catalyst exotherm temperature due to an exothermic reaction at the inlet of the catalyst.

6. The method as recited in claim 1 wherein the step of controlling the heater comprises:

determining whether the total catalyst temperature exceeds a first temperature threshold; and if the total catalyst temperature does not exceed the first temperature threshold, providing power to the heater.

7. The method as recited in claim 6 wherein the step of controlling the heater further comprises:

determining whether the total catalyst temperature exceeds a second temperature; and if the total temperature exceeds the second temperature threshold, prohibiting the power from being provided to the heater.

8. The method as recited in claim 1 further comprising the step of storing the heater instantaneous temperature rise in a memory as a previous heater instantaneous temperature rise.

9. The method as recited in claim 8 further comprising:

determining whether the vehicle was previously turned off; and if the vehicle was previously turned off, determining the heater instantaneous temperature rise based on the previous heater instantaneous temperature rise.

10. The method as recited in claim 9 wherein the step of determining the heater instantaneous temperature rise based on the previous heater instantaneous temperature rise comprises:

determining a rate of heat dissipation due to the heating element; and determining a period of time indicating how long the vehicle was turned off.

11. For use in reducing exhaust gas emissions of an internal combustion engine including an exhaust passage, an electrically heated catalyst having an inlet and an outlet and a heating element disposed in the exhaust passage, and a power supply for providing power to the heating element, a system for estimating and controlling a temperature of the electrically heated catalyst, the system comprising:

a sensor for sensing a mass of air flow into the engine and generating a corresponding mass air flow signal;

means for determining a catalyst inlet temperature at the inlet of the catalyst;

means for determining a heater steady-state temperature rise of the heating element based on the catalyst inlet temperature;

means for determining a heater instantaneous temperature rise of the heating element having a time constant based on the heater steady-state temperature rise and the mass air flow signal;

means for determining a total catalyst temperature of the catalyst based on the catalyst inlet temperature and the heater instantaneous temperature rise; and a control unit for controlling the heating element of the electrically heated catalyst based on the total catalyst temperature.

12. The system as recited in claim 11 wherein the heater steady-state temperature rise (ext_ss_ehc) is linearly related to the catalyst inlet temperature (ext_cin) having an intercept (ext_ehc_int) and a slope (ext_ehc_slp) and wherein the heater steady-state temperature rise is determined in accordance with the expression:

$$ext\_ss\_ehc = ext\_ehc\_int - (ext\_ehc\_slp * ext\_cin).$$

13. The system as recited in claim 11 wherein the means for determining the heater instantaneous temperature rise includes means for determining a filter constant representing a digital implementation of time constant and wherein the heater instantaneous temperature rise (ext_ehc) is determined in accordance with the expression:

$$ext\_ehc = fk\_ehc * ext\_ss\_ehc + (1 - fk\_ehc) * ext\_ehc(old),$$

where fk_ehc is the filter constant, ext_ss_ehc is the heater steady-state temperature rise and ext_ehc(old) is the previously determined heater instantaneous temperature rise.

14. The system as recited in claim 11 wherein the means for determining the total catalyst temperature further includes means for determining a catalyst exotherm temperature due to an exothermic reaction at the inlet of the catalyst.

15. The system as recited in claim 11 wherein the control unit comprises:

means for determining whether the total catalyst temperature exceeds a first temperature threshold; and means for providing the power to the heater.

16. The system as recited in claim 15 wherein the control unit further comprises:

means for determining whether the total catalyst temperature exceeds a second temperature; and means for prohibiting the power from being provided to the heater.

17. The system as recited in claim 11 further comprising means for storing the heater instantaneous temperature rise as a previous heater instantaneous temperature rise.

18. The system as recited in claim 17 further comprising:

means for determining whether the vehicle was previously turned off; and means for determining the heater instantaneous temperature rise based on the previous heater instantaneous temperature rise.

19. The system as recited in claim 18 wherein the means for determining the heater instantaneous temperature rise based on the previous heater instantaneous temperature rise comprises:

means for determining a rate of heat dissipation due to the heating element; and means for determining a period of time indicating how long the vehicle was turned off.

20. The system as recited in claim 19 wherein the means for determining a period of time is a capacitor.

* * * * *